United States Patent [19]

Kuroda et al.

[11] 4,051,530
[45] Sept. 27, 1977

[54] FRAME-TO-FRAME CODING SYSTEM

[75] Inventors: Hideo Kuroda, Kodaira; Fumio Kanaya, Seki, both of Japan

[73] Assignee: Nippon Telegraph and Telephone Public Corporation, Tokyo, Japan

[21] Appl. No.: 624,021

[22] Filed: Oct. 20, 1975

[30] Foreign Application Priority Data

Oct. 21, 1974 Japan .................... 49-121165
Nov. 18, 1974 Japan .................... 49-132016

[51] Int. Cl.$^2$ ............................................ H04N 7/12
[52] U.S. Cl. .................................... 358/136; 325/38 B
[58] Field of Search ............... 178/DIG. 3, 6.8, 7.1; 358/136

[56] References Cited

U.S. PATENT DOCUMENTS 3,562,744  2/1971  Howlett .................... 340/347 AD

OTHER PUBLICATIONS

Candy et al., "Transmitting Television as Clusters of—," Bell System Technical Journal, vol. 50, No. 6, 7/71.

Primary Examiner—Thomas J. Sloyan
Attorney, Agent, or Firm—Sughrue, Rothwell, Mion, Zinn and Macpeak

[57] ABSTRACT

An input video signal is fed to a substracter wherein a difference is taken between the input and the output from a frame memory to provide a difference signal, the magnitude of which is controlled by a magnitude adjuster. The controlled output is then fed to a threshold circuit, from which a significant difference signal is derived which has a magnitude above a given level. The significant difference signal is quantized by an encoder into a code having a reduced number of bits as compared with the inputted significant difference signal. The quantized code is written into a buffer memory, and is read out therefrom at a uniform bit rate to a transmission line. A sum of a signal indicative of the representative level of the quantized code from the encoder and the output of the frame memory is formed in an adder, and the sum signal is written into the frame memory and read out subsequently or after one frame. The occupancy of the buffer memory is detected to provide a control over the magnitude adjuster in accordance with the detected value so as to prevent an overflow from the buffer memory. A signal to refresh the frame memory located on the receiving side is transmitted by writing the output of the adder into the buffer memory after switching from the output of the encoder to the output of the adder.

10 Claims, 6 Drawing Figures

FRAME-TO-FRAME CODING SYSTEM

BACKGROUND OF THE INVENTION

The invention relates to an interframe coding system for transmission of a signal, such as a television signal, which has a relatively high frame-to-frame correlation, by compressing the bandwidth of the signal.

An interframe coding system represents a scheme for reduction of the transmission bit rate. In this scheme, a difference between the signals of successive frames is taken to provide a significant difference signal wherever the difference exceeds a given threshold value, which significant difference signal alone is encoded and fed to a buffer memory for transmission at a uniform bit rate. By way of example, an input video signal may be digitized in a 8 bit PCM code, for example. The digitized signal is supplied to a frame subtracter in which a difference between the supplied signal value and a picture element value from a corresponding position of a preceding frame stored in a frame memory is taken, and the resulting difference signal is fed to a threshold circuit in which a signal in excess of a given level is derived as a significant difference signal for conversion into a 4 bit code, for example, in a quantizer. The code obtained is sequentially written into the buffer memory, and thence transmitted at a uniform bit rate as a transmission code. On the other hand, the output code from the quantizer is converted into a 8 bit code of a level representative of a quantization range in which it existed, a sign bit being added to the 8 bit code. The converted code and the output of the frame memory are added together and written into the frame memory. With such interframe coding system, the number of transmission codes is reduced and the transmission bandwidth considerably compressed where a variation in the video signal is low. However, if a rapid change occurs in the picture, the frequency of occurrence of the significant difference signal will be appreciably increased, which may result in an overflow from the buffer memory. The use of a buffer memory having sufficient capacity to prevent such an overflow results in not only a high cost, but also in an awkward situation in the application of the visual telephone, for example, as a result of a delay of the picture signal relative to the voice signal. Consequently, the capacity of the buffer memory is constrained to two to three frames at most, with consequent likelihood of an overflow from the buffer memory which results in a loss of the information to give a considerable degradation in the image quality for a rapidly varying picture.

An improvement which minimizes the occurrence of such an overflow is known as FRODEC system which is described, for example, in an article "Transmitting Television as Clusters of Frame-to-Frame Differences" by J. C. Candy et al in B.S.T.J., Vol. 50, No. 6 (1971 July-August issue), pages 1889 to 1917. According to this system, the occupancy of the buffer memory is monitored, and the threshold value of the threshold circuit to which the output from the frame subtracter is supplied is controlled in accordance with the occupancy. Thus, as the buffer memory is approaching its full capacity, the threshold value is increased to reduce the generation of the significant difference signal and hence the number of codes which are written into the buffer memory. However, an excessively high threshold value causes a stepwise change in the picture signal, degrading the image quality. As a consequence, the threshold value cannot be controlled over a broad range, so that the likelihood of an overflow occurring remains for a rapidly varying picture. As further alternatives, a subsample mode is proposed in which every other picture element rather than every picture element is extracted for a rapidly varying picture, as well as the limitation of the information content by changing the operation mode to an alternate line mode in which the encoding takes place for every other scanning line. However, the image quality is degraded with these operation modes, and the frequency of their occurrence is high for a rapidly varying picture, so that the overall image quality is degraded.

In the interframe coding system, only the significant difference signal is encoded for transmission as mentioned previously. Consequently, the received signal is decoded on the receiving side to produce the significant difference signal, which is added to a corresponding picture element value of a preceding frame which is read out from the frame memory, and the sum is written into the frame memory, thus obtaining the decoded signal. The decoded digital signal then is converted into an analog signal to reproduce the original video signal. In view of the sequential formation of the sum of the received decoded signal value and the signal value from the frame memory on the receiving side, any code error which might occur over the transmission channel may be directly written into the frame memory on the receiving side, thus preserving such error. In consideration of this drawback, the 8 bit PCM codes from several horizontal scanning lines per each frame are directly supplied, after A-D conversion, to the buffer memory, and on the receiving side, the received PCM codes are directly written into the frame memory without being added with the corresponding code from the frame memory. The horizontal scanning lines for which the PCM codes are directly supplied are shifted for successive frames so that the frame memory on the receiving side can be refreshed over a plurality of frames. Conversely, where no change in the picture takes place for a prolonged period of time, an underflow will occur in the buffer memory of the transmitting side, resulting in a difficulty that data once read is repeatedly read out. To prevent such an underflow, it has been the practice to eliminate the formation of the difference so as to supply the PCM code directly into the buffer memory for transmission to thereby permit the frame memory on the receiving side to be refreshed when the occupancy of the buffer memory is considerably reduced.

As summarized above, the PCM code from A-D conversion has been directly transmitted in order to refresh the frame memory on the receiving side. Where the refreshing technique is not employed, the significant difference signal is derived from the difference signal and quantized for transmission as a code having a reduced number of bits, which code is decoded on the receiving side to form the sum signal. However, a degradation in the image quality is caused by the quantization process or the like, with result that an area of a high image quality which is achieved by virtue of the refreshing technique appears as a streak in a restored picture, which travels vertically for successive frames as a result of a change of such area from frame to frame.

It is an object of the invention to provide an interframe coding system capable of assuring a high image quality.

It is another object of the invention to provide an interframe coding system which is insusceptible to the occurrence of an overflow from a buffer memory which is used for the purpose of smoothing the transmission bit rate, and which is also insusceptible to a degradation in the image quality.

It is a further object of the invention to provide an interframe coding system which assures a high image quality while minimizing its operation in the subsample or subline modes.

It is an additional object of the invention to provide an interframe coding system which achieves a high band compression effect and a high image quality.

It is still another object of the invention to provide an interframe coding system which refreshes a frame memory on the receiving side while preventing the occurrence of a streak.

SUMMARY OF THE INVENTION

An input video signal is converted into a 8 bit PCM code, for example, in an A-D converter in the similar manner as performed in the prior art. A difference between the PCM code and the code of a corresponding position of a preceding frame which is supplied from a frame memory is taken in a frame subtracter. In accordance with the invention, the output of the subtracter is supplied to a magnitude adjuster, and the magnitude is controlled in accordance with the prevailing occupancy of a buffer memory which is used for smoothing the transmission bit rate. For example, as the full state of the buffer memory is approached, the magnitude is increasingly attenuated in a digital manner. The difference signal of a controlled magnitude is quantized in an encoder, and is outputted as a 4 bit code, for example, which is indicative of a representative level in a particular quantization range in which the difference signal appeared. The code indicative of the quantization range is written into the buffer memory which is used to smooth the transmission bit rate, and is read out therefrom at a uniform bit rate for transmission. The occupancy of the buffer memory is detected in order to control the magnitude adjuster in accordance therewith. The code from the encoder which indicates the representative level is supplied to a frame adder in which it is added with the output from the frame memory. In this manner, the magnitude of the difference output is controlled in accordance with the occupancy of the buffer memory, so that the compression effect is improved and the chance of an overflow reduced as compared with a conventional threshold control. Because the threshold control is avoided, a stepwise change in the picture is removed, and is replaced by a blur, resulting in a reduction in the visually perceptible degradation. The band compression effect can be substantially improved by using a variable word length encoder which converts the quantized code into another code having a variable number of bits such that the number of bits is reduced in accordance with a preestablished rule as the frequency of its occurrence increases, before it is supplied to the buffer memory. The code having the representative level which is supplied from the encoder can have its magnitude controlled by a magnitude adjuster which operates in the opposite manner from the first mentioned magnitude adjuster, thereby improving the tracking capability to a change in the input signal. In this instance, it is necessary to transmit a code indicative of the control applied to the magnitude adjuster on the transmitting side to the receiving side, where the magnitude of the decoded code may be controlled in accordance with a code indicative of the magnitude control which is detected on the receiving side.

Furthermore, in accordance with the invention, the output of the adder or the input to the frame memory rather than the output of the A-D converter is supplied to the buffer memory of the transmitting side when refreshing the frame memory located on the receiving side. Since a refreshing signal which is influenced by the quantizer or having the same image quality as the transmitted signal during the time other than the refreshing period is transmitted, the occurrence of the streak on the restored picture is avoided.

DETAILED DESCRIPTION OF PREFERRED EMBODIMENTS

Figure 1:
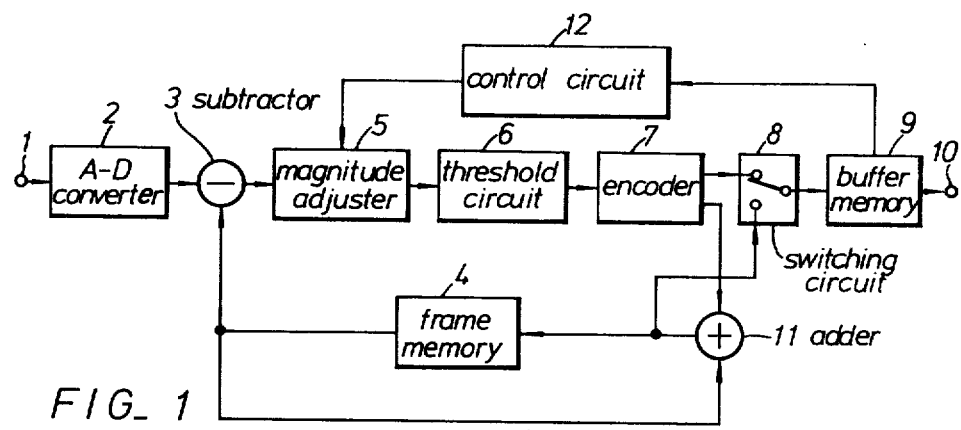
FIG. 1 is a block diagram showing the basic arrangement of the interframe coding system according to the invention.

Referring to FIG. 1, an input video signal in analog form is applied to an input terminal 1 and thence to an A-D converter 2 where the input signal is periodically sampled for each picture element, and thus converted into an 8 bit PCM code representing one of 256 levels, for example, depending on the sampled value. The PCM code is applied to a subtractor 3 where a difference is taken between the PCM code applied and a code from a corresponding picture element position of the encoded signal of the immediately preceding frame which is read out from a frame memory 4. A sign indication bit indicative of the polarity of the signal is supplied to the output from the subtracter 3, thereby forming a 9 bit PCM code. However, the output from the subtracter 3 is frequently null or remains a small value unless a rapid change occurs in the picture represented by the input signal.

In accordance with the invention, there is provided a magnitude adjuster 5 to which the difference signal is applied in order to have its level controlled in a digital manner. The level controlled difference signal is applied to a threshold circuit 6 which produces a significant difference signal in response to a signal which exceeds a given threshold value. When a variation in the picture is small, the significant difference signal is produced infrequently while it is produced very frequently for a rapidly varying picture. The significant difference signal in the 9 bit PCM code form, indicative of one of a total of 511 levels for the both polarities, is applied to an encoder 7 which outputs a 4 bit code representing a particular one of 16 quantization ranges, for example, in which it appeared. The quantization ranges are established such that a quantization range of a lower level has a small breadth while the breadth of the quantization range is increased with the rising level.

The encoded output is supplied through a switching circuit 8 to a buffer memory 9 which is used to smooth the transmission bit rate. This input code is written into the memory 9 as a serial code, and is later read out therefrom at a uniform bit rate to be delivered to an output terminal 10 as a transmission code. In this manner, the significant difference signal is quantized in the encoder 7 to be outputted therefrom as the 4 bit code, and a signal indicative of a representative level of the quantized code is supplied in the 9 bit code form to an adder 11 where it is added with a code for the corresponding picture element of the previous frame which is read out from the frame memory 4. In other words, the 4 bit code from the encoder 7 is decoded into the PCM signal and then written into the frame memory 4, and subsequently read out therefrom after one frame to be supplied to the subtracter 3 and the adder 11, respectively.

In accordance with the invention, a control circuit 12 is provided which monitors the occupancy of the buffer memory 9 in order to suppress the amplitude of the difference signal by the magnitude adjuster 5 as the stored content approaches the full capacity of the buffer memory. Thus, as the frequency of occurrence of the significant difference signal increases to result in an increase in the amount of information stored in the buffer memory 9, the amplitude of the difference signal from the subtractor 3 is suppressed, whereby the frequency of occurrence of the significant difference signal which exceeds the threshold value established in the threshold circuit 6 is reduced, thus preventing an overflow from the buffer memory.

The switching circuit 8 is normally in a position in which it connects the output of the encoder 7 to the buffer memory 9, but is thrown to the other position when refreshing the frame memory on the receiving side in accordance with the invention, thus supplying the output of the adder 11 or the decoded signal which is inputted into the frame memory 4 to the buffer memory 9. The switching of the circuit 8 takes place periodically and also when the amount of information stored in the buffer memory 9 is reduced to cause an underflow. Since the signal which refreshes the frame memory on the receiving side is of the same quality as the signal which is normally decoded on the receiving side, the occurrence of a streak on the restored picture of the receiving side is eliminated. It is to be particularly noted that since the refreshing signal is of substantially the same quality as the decoded signal as mentioned above, the invention eliminates an increased noticeability of the streak on the restored picture of the receiving side which occurs when the output of the A-D converter 2 is transmitted as a refreshing signal because of the fact that the transmitted image quality is degraded as compared with the output code from the A-D converter 2 when the level suppression takes place in the magnitude adjuster 5 as contrasted to that without the level suppression.

Figure 2:
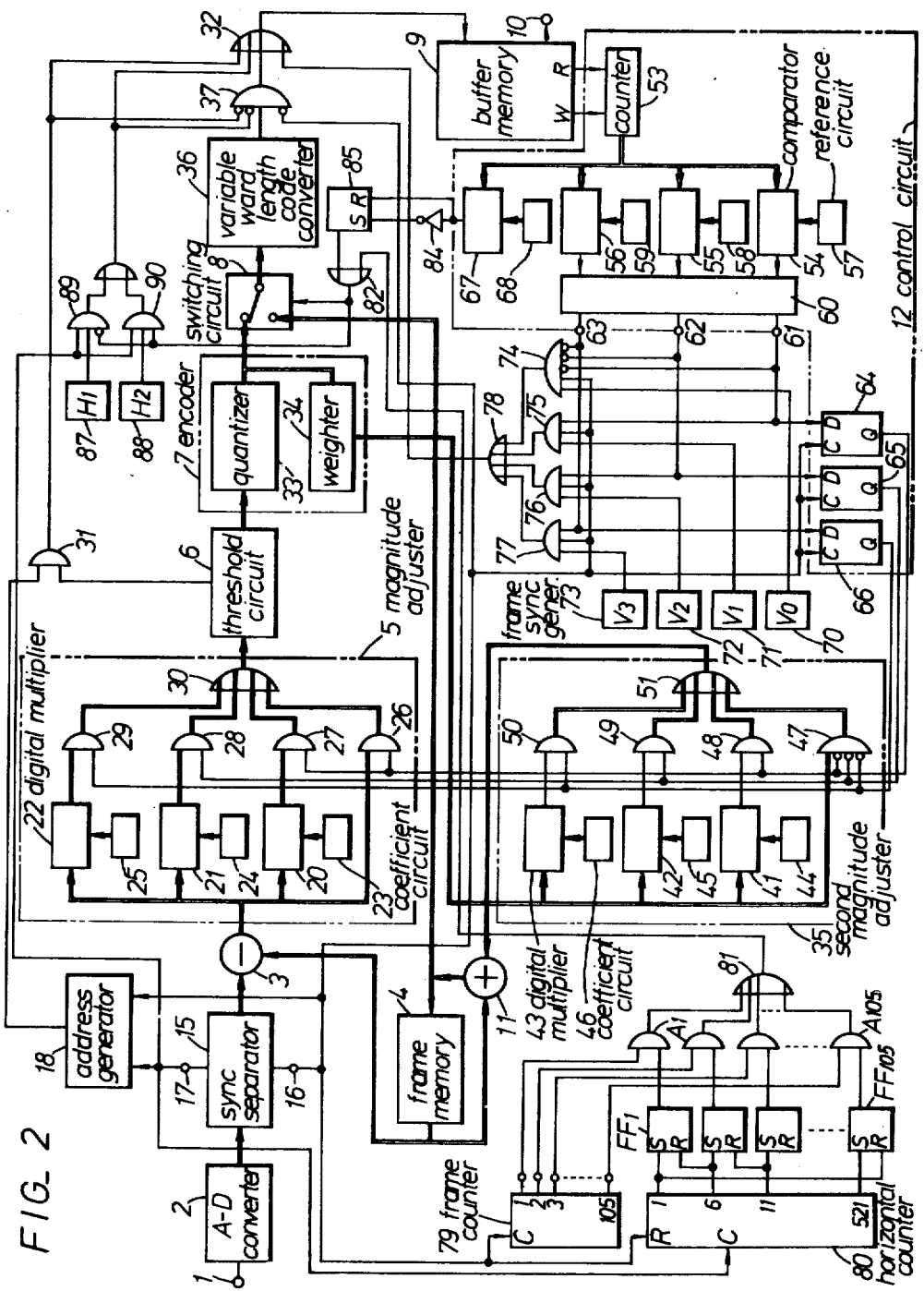
FIG. 2 is a block diagram of one embodiment of the interframe coding system of the invention.

One embodiment of the interframe coding system according to the invention will be more specifically described below with reference to FIG. 2. In FIG. 2, corresponding parts to those shown in FIG. 1 are designated by like reference characters. As before, the video signal in the analog form which is applied to the input terminal 1 is converted into a 8 bit PCM code for each picture element by the A-D converter 2, and the PCM code is supplied to the subtracter 3 through a sync separator 15. The sync separator 15 produces a frame sync signal at its terminal 16 and a horizontal sync signal at its terminal 17. The both sync signals from the terminals 16, 17 are supplied to an address generator 18 which produces a series of digital address signals which indicate the position of the picture elements corresponding to the respective inputted PCM codes on the picture field. The output of the separator 15 is applied to the subtracter 3 where a difference between such output and the decoded signal of the immediately preceding frame which is supplied from the frame memory 4 is taken to produce a 9 bit difference signal, which is supplied to the magnitude adjuster 5.

In the magnitude adjuster 5, the difference signal is directly supplied to an AND circuit 26 and also to digital multipliers 20 to 22. These multipliers form a product of the difference signal and coefficients $k_1$ to $k_3$ in a digital manner, the coefficients $k_1$ to $k_3$ being established by respective coefficient circuits 23 to 25. The outputs from the multipliers 20 to 22 are supplied to AND circuits 27 to 29, respectively. Under the control of the control circuit 12, one of the difference signals from and AND circuits 26 to 29 is passed through an OR circuit 30 and supplied to the threshold circuit 6 as the output of the adjuster 5. The threshold circuit 6 produces a significant difference signal for an input signal which exceeds a pre-established threshold value, and supplies it to the encoder 7. For each occurrence of the significant difference signal, a gate 31 is opened for a given time interval to pass the address code for the concurrently occuring picture signal which is produced by the address generator 18, serially through an OR circuit 32 to the buffer memory 9 so as to be written therein. Thus, before the encoded output for the significant difference signal is transferred, the address signal indicating its position on the picture frame is transmitted.

The significant difference signal is quantized by a quantizer 33 which is contained in the encoder 7, and is outputted to the switching circuit 8 as a 4 bit code indicating a particular quantization range and is also supplied to a weighter 34. The weighter 34 derives a 9 bit representative level signal corresponding to the particular quantization range from the inputted 4 bit code, and supplies this signal to a second magnitude adjuster 35. It is to be noted that the quantizer 33 and the weighter 34 can be made as a single hardware.

The output code from the switching circuit 8 is supplied to a variable word length code converter 36, which converts the 4 bit input code to another code having a number of bits which decreases with an increasing frequency of occurrence of the 4 bit code so as to further reduce the overall number of bits, as described in IEE Transactions on Communication Technology, Dec. 1971, Vol-com-19, No. 6, page 923, "Variable-Length-Redundancy Removal Coders for Differentially Coded Video Telephone Signals" by M. C. Chow. The signal which is outputted from the converter 36 in the form of a serial code is passed through an inhibit gate 37 and OR circuit 32 to be written into the buffer memory 9 which is used to smooth the transmission bit rate. A read-out is made from the buffer memory 9 at a uniform bit rate to feed the output terminal 10.

The representative level signal from the encoder 7 has its magnitude controlled in the second magnitude adjuster 35 in the opposite manner from the control applied by the first mentioned magnitude adjuster 5. At this end, the representative level signal is directly supplied to AND circuit 47 as well as digital multipliers 41 to 43. The multipliers 41 to 43 form a product of the representative level signal with respective coefficients $1/k_1$, $1/k_2$ and $1/k_3$ which are established by coefficient circuits 44 and 46, and supply their output to AND circuits 48 to 50, respectively. One of the codes from the AND circuits 47 to 50 is passed through OR circuit 51 to be supplied to the adder 11 as an output from the adjuster 35. The output of the adder 11 is written into the frame memory 4, and is read out therefrom after one frame for supply to the subtracter 3 and the adder 11, respectively.

The control circuit 12 includes a reversible counter 53 which is counted up by one for each entry of a bit of the information from the OR circuit 32 into the buffer memory 9, and is counted down each time a bit is read out from the memory 9 to the output terminal 10. The count in the counter 53 is supplied to a plurality of comparators 54 to 56 for comparison with predetermined reference values established in reference circuits 57 to 59. When the count exceeds any of these reference values, the output of a corresponding comparator assumes a high level or "$l$". By way of example, for an input video signal having a frequency band of 4 MHz, the buffer memory 9 may have a capacity of 200 $k$ bits, and the reference circuits 57, 58 and 59 may have reference values of 50,000, 110,000, 170,000, respectively. The output from the comparators 54 to 56 are supplied to a circuit 60 which comprises a combination of AND circuits so that a high level output is produced at a terminal 61 when only the comparator 54 produces a "1" output, a high level output is produced at a terminal 62 when only the comparators 54 and 55 provide a "1" output, and a high level output is produced only at a terminal 63 when all of the comparators 54 to 56 provide a "1" output. The output appearing at the terminals 61 and 63 are supplied to respective data input terminal D of D type flipflops 64 to 66, respectively. Each time a frame sync signal is detected by the sync signal separator 16, the data input is entered into these flipflops 64 to 66, the Q output of which is supplied as an output from the control circuit 12 to the AND circuits 27 to 29 of the magnitude adjuster 5, respectively, and to the AND circuits 48 to 50, respectively, of the magnitude adjuster 35, and their negations are all supplied to the AND circuits 26 and 47.

Continuing the above example and assuming that the stored content in the buffer memory 9 is less than 50,000 bits, only and AND circuits 26 and 47 in the adjusters 5 and 35 will be opened whereby the difference signal is supplied to the threshold circuit 6 without amplitude suppression, and the representative level signal from the encoder 7 will be directly supplied to the adder 11. When the bit content in the buffer memory 9 exceeds 50,000 bits, the terminal 61 will assume a high level, which is applied to the flipflop 64 to enable the AND circuits 27 and 48. The coefficients $k_1$, $k_2$ and $k_3$ may be chosen 3/4, 2/4 and 1/4, respectively, and in this instance the difference signal will experience the amplitude suppression by a factor of 3/4 before being supplied to the threshold circuit 6, while the representative level signal is expanded by a factor of 4/3 before being supplied to the adder 11. As the occupancy of the memory 9 further increases to exceed 110,000 bits, the terminal 62 will assume a high level, which enables the AND circuits 28 and 49, so that the difference signal will experience an amplitude suppression by a factor of 2/4 before it is supplied to the threshold circuit 6 while the representative level signal will be increased by a factor of 4/2 before it is supplied to the adder 11. In this manner, as the bit content in the buffer memory 9 increases and exceeds a certain threshold, the amplitude of the difference signal is suppressed to reduce the occurrence of the significant difference signal from the threshold circuit 6, thus minimizing an overflow from the buffer memory 9. In contrast to a control of the threshold value in the threshold circuit 6, that component of the difference signal which exceeds the threshold value has its amplitude compressed in the adjuster 5, so that the likelihood of an overflow is reduced and the restored picture will be blurred rather than changing stepwise, thus minimizing the visually perceptible degradation. Since the representative level signal is controlled in the adjuster 35 in the opposite manner from the control applied to the difference signal, a decoded signal which closely replicate the original signal is obtained from the adder 11, thus increasing the rate of tracking to a change in the input signal.

It is necessary to store the same content as the stored content in the frame memory 4 of the transmitting side in a frame memory which is located on the receiving side. In order to control the magnitude of the representative level signal, it is necessary to transmit this control information also to the receiving side. At this end, four codes $V_0$ to $V_3$ are used as the frame sync signal in the present example, and are selectively transmitted in accordance with the control by the adjuster 5. Specifically, there are provided a plurality of frame sync code generators 70 to 73, the output codes $V_0$ to $V_3$ of which are supplied to a plurality of AND circuits 74 to 77, respectively, and the output from the terminals 61 to 63 are supplied to the plurality of AND circuits 75 to 77, respectively. The negation of all of the outputs from the terminals 61 to 63 are supplied to AND circuit 74. In addition, the AND circuits 74 to 77 also receive the output from the terminal 16 which indicates a detection of the frame sync signal. Thus, when the difference signal does not experience an amplitude suppression, the detection of the frame sync signal causes the frame sync code $V_0$ in the serial form to be fed from the code generator 70 through AND circuit 74 and OR circuit 78 to the OR circuit 32, and thence written into the buffer memory 9. When the difference signal experiences an amplitude suppression by a factor of 3/4, the frame sync code $V_1$ in the serial form which is supplied by the code generator 71 is passed through AND circuit 75 and OR circuits 78, 32 to be written into the buffer memory 9. When the difference signal experiences an amplitude suppression by a factor of 2/4, the frame sync code $V_2$ from the code generator 72 is written into the frame memory, and when the amplitude suppression is by a factor of 1/4, the frame sync code $V_3$ from the code generator 73 is written into the buffer memory 9.

The control over the switching circuit 8 will now be described. The function of the switching circuit 8 is to connect the variable word length code converter 36 with the adder 11 for a given time interval, for example, for five consecutive horizontal scanning lines during one frame, with the five horizontal scanning lines being sequentially shifted for successive frames. At this end, the output from the terminal 16 which indicates a detection of the frame sync signal is supplied to a frame counter 79 which is a ring counter having a full count of 105 and having its respective output terminals connected with a plurality of AND circuits $A_1$, $A_{105}$. The horizontal sync output from the terminal 17 is supplied to a horizontal counter 80 which is a ring counter having a full count which is equal to the number of horizontal scanning lines of the input video signal, for example, 525. The output from every fifth output terminal, 1, 6, 11, 16 ... 525 is connected so as to set a plurality of flipflops $FF_1$ to $FF_{105}$ and to reset the immediately preceding flipflop in a sequential manner, whereby pulses corresponding to five consecutive horizontal scanning lines and which shift with time are obtained from the flipflops $FF_1$ to $FF_{105}$ and are applied to the AND circuits $A_1$ to $A_{105}$. The output from the AND circuits $A_1$ to $A_{105}$ is passed through an OR circuit 81 and another OR circuit 82 to be supplied to the control terminal of the switching circuit 8. Consequently, the switching circuit 8 is connected with the adder 11 for a time interval corresponding to the first to fifth horizontal scanning line during the first frame, for a time interval corresponding to sixth to eleventh horizontal scanning line during the second frame, and so on. Thus, the time during which the switching circuit is connected with the adder 11 shifts in time by an amount corresponding to five lines for successive frames. In this manner, the output from the adder 11 is transmitted as a refreshing signal for a given time interval during one frame.

The refreshing signal is also transmitted when the stored content in the buffer memory 9 is considerably reduced to cause an underflow. Specifically, the count in the counter 53 of the control circuit 12 is compared in the comparator 67 against the threshold value established in the threshold circuit 68, and the output of the comparator 67 is fed to the set terminal of a flipflop 85 through a negation circuit 84 and is also fed to the reset terminal thereof without being passed through a negation circuit. Thus, when the stored content in the buffer memory 9 is reduced below the threshold value established in the threshold circuit 68, for example, 20,000 bits, the flipflop 85 is set, and its output is supplied to the control terminal of the switching circuit 8 through OR circuit 82. In other words, when the stored content in the buffer memory 9 is reduced below 20,000 bits, the output of the adder 11 is supplied to the variable word length code converter for transmission of the refreshing signal. When the stored content in the buffer memory 9 increases above 20,000 bits, the flipflop 85 is reset, whereby the switching circuit 8 is again connected with the encoder 7.

When the refreshing signal is transmitted, it is necessary to write it directly into the frame memory located on the receiving side without adding it with a code read out from the frame memory. Thus, it is necessary to signal the transmission of the refreshing signal to the receiving side. At this end, there are provided a horizontal sync code generator 87 which indicates the transmission of the difference signal or the output of the encoder 7, and a horizontal sync code generator 88 which indicates the transmission of the refreshing signal or the output of the adder 11. The outputs of these code generators 87, 88 are supplied to AND circuit 89 and 90, respectively, which also receive the output from the terminal 17 indicating the detection of a horizontal sync signal. Additionally, the output of the OR circuit 82 or the control signal to the switching circuit 8 is supplied to the AND circuit 90 while its negation signal is supplied to the AND circuit 89. As a result, when the switching circuit 8 is connected with the encoder 7, the horizontal sync code $H_1$ in the serial form which is supplied by the code generator 87 is passed through the AND circuit 89 and OR circuit 32 to be written into the buffer memory 9 for each detection of the horizontal sync signal. When the switching circuit 8 is connected with the adder 11, the horizontal sync code $H_2$ in the serial form which is supplied by the code generator 88 is passed through the AND circuit 90 and OR circuit 32 to be written into the buffer memory 9 for each detection of the horizontal sync signal. Whenever the control codes such as the address signal, the frame sync code, the horizontal sync code or the like is fed to the OR circuit 32, the passage of the output of the variable word length code converter 36 through the AND circuit 37 is blocked. While not shown, it is to be understood that the overall circuit is controlled by a clock from a basic clock generator.

Figure 3:
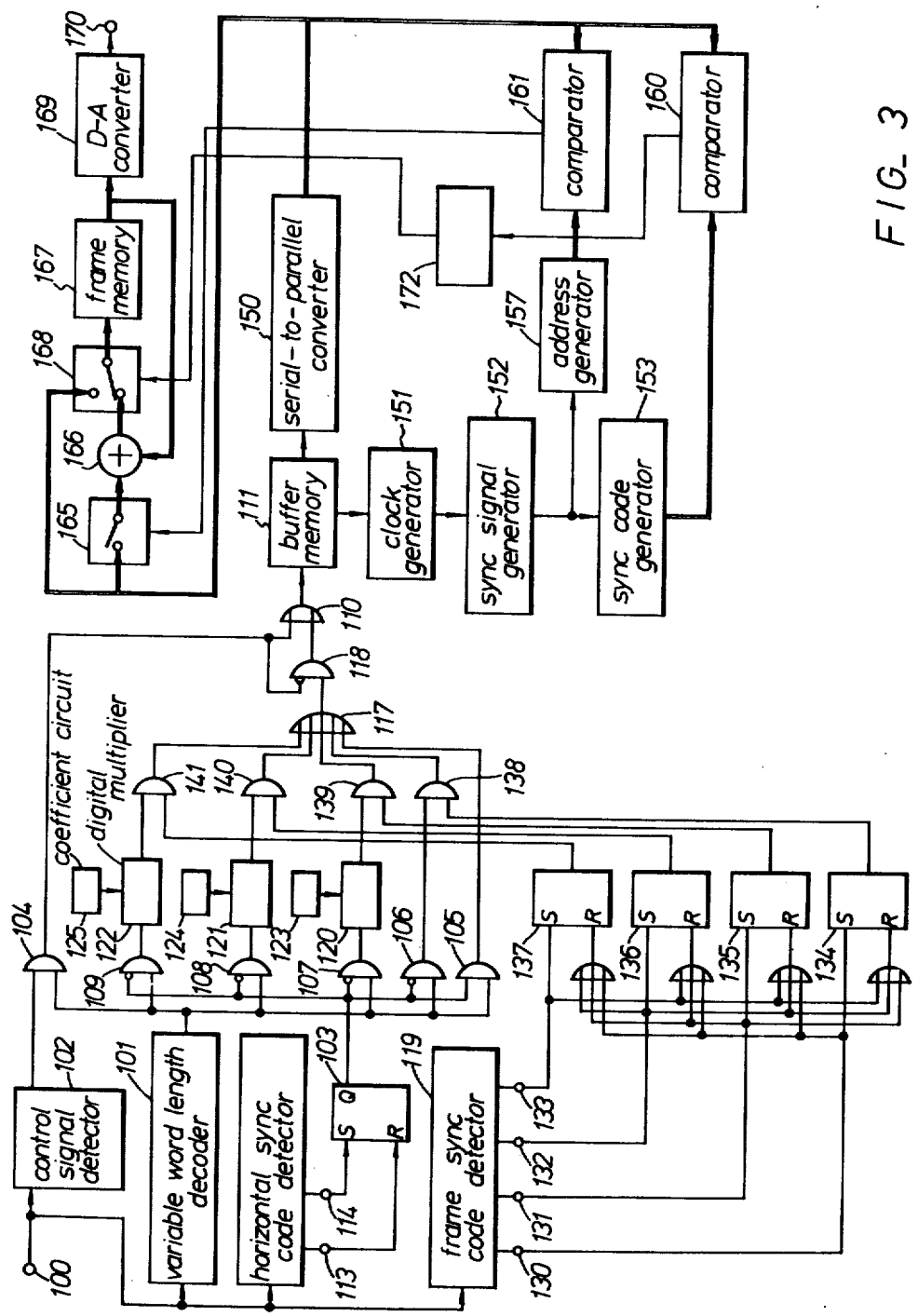
FIG. 3 is a block diagram of an arrangement on the receiving side which receives a signal encoded in accordance with the interframe coding system of the invention.

Referring to FIG. 3, an arrangement which is used on the receiving side will be described. The digital signal of a uniform bit rate which is received over the transmission path is applied to an input terminal 100, and thence to a variable word length decoder 101, a control signal detector 102 and a horizontal sync code detector 103. The variable word length decoder 101 functions in the opposite manner from the function of the variable word length code converter 36 shown in FIG. 2 and which is located on the transmitting side. The output of the decoder 101 is supplied to a plurality of AND circuits 104 to 109. The detector 102 functions to detect a control signal such as the address signal, the sync code or the like, and whenever a control signal is detected, an AND circuit 104 is enabled to pass the control signal contained in the output from the decoder 101 through the AND circuit 104 and an OR circuit 110 to be written into a buffer memory 111. When the detector 103 detects the horizontal sync code $H_1$ which is produced when the encoded output for the significant difference signal is being transmitted, a terminal 113 assumes a high level, while when the horizontal sync code $H_2$ indicative of the transmission of the refreshing signal is detected, a terminal 114 assumes a high level. When $H_2$ is detected, a flipflop 116 is set, the output of which is supplied to an AND circuit 105 and its negation supplied to the AND circuits 106 to 109. Thus, during the reception of the refreshing signal, only the circuit 105 of a family of AND circuits 105 to 109 is enabled to pass the output of the decoder 101, which output is passed through an OR circuit 117, AND circuit 118 and OR circuit 110 to be written into the buffer memory 111.

The received code from the input terminal 100 is also supplied to a frame sync code detector 119, and when the frame sync code $V_0$ indicating no suppression of the magnitude of the difference signal on the transmitting side is detected, a terminal 130 assumes a high level. When frame sync codes $V_1$, $V_2$ and $V_3$ corresponding to an amplitude suppression by a factor of 3/4, 2/4 and 1/4 are detected, a high level output is produced at terminals 131, 132 and 133, respectively. The output from the terminals 130 to 133 is fed to the set terminal of a plurality of flipflops 134 to 137, and is also fed to the reset terminal of all other flipflops. By way of example, when the terminal 130 assumes a high level, the flipflop 134 is set while all other flipflops 135 to 137 are reset. The set output of the flipflops 134 to 137 is supplied to a plurality of AND circuits 138 to 141, respectively.

The output of the AND circuits 107 to 109 is supplied to a pluralty of digital multipliers 120 to 122, respectively, which multiply this output by a coefficient $1/k_1$ to $1/k_3$, which are established in respective coefficient circuits 123 to 125. The coefficient value established in the coefficient circuits 123 to 125 is the reciprocal of the coefficient value established in the coefficient circuits 23 to 25 of the magnitude adjuster 5 located on the transmitting side. The outputs from these multipliers 120 to 122 are supplied to AND circuits 139 to 141, respectively. AND circuits 138 receives the output from the AND circuit 106. The outputs from the AND circuits 138 to 141 are passed through the OR circuit 117, AND circuits 118 and OR circuit 110 to be written into the buffer memory 111. Consequently, when the frame sync code $V_0$ is received, the output of the decoder 101 is passed through the AND circuit 106, thus experiencing no amplitude control, and through AND circuit 138 to be written into the buffer memory 111. When the detector 119 detects the frame sync code $V_1$, the AND circuit 139 is enabled to multiply the output of the decoder 101 by a factor of $1/k_1$ in the multiplier 120. Thus this output is expanded by a factor corresponding to the amplitude suppression performed on the transmitting side before it is written into the buffer memory 111. When the control signal is outputted from the AND circuit 104 to be written into the buffer memory 111, the AND circuit 118 is disabled to prevent the output of the decoder 101 from being supplied to the buffer memory 111.

The data stored in the buffer memory 111 is fed to a serial-to-parallel converter 150 in the sequence in which it is written into the memory 111. A clock generator 151 is driven by the buffer memory 111, and the clock produced thereby is fed to a sync signal generator 152 which produces a frame sync signal and a horizontal sync signal, which are then supplied to a sync code generator 153 for producing a horizontal sync code $H_2$, which is supplied to a comparator 160. The combination of the frame sync signal and the horizontal sync signal is also supplied to an address generator 157, which successively generates the same address code as that produced by the address generator 18 of the transmitting side, shown in FIG. 2, the address code generated being supplied to a comparator 161. The comparators 160 and 161 also receive the output from the serial-to-parallel converter 150. When a coincidence is detected in the comparator 161, its output turns on a switching circuit 165, whereby the difference code which follows that particular address code is supplied from the converter 150 to an adder 166. A code read out from a frame memory 167 is also supplied to the adder 166, and the sum signal is passed through a switching circuit 168 to be written into the frame memory 167. The code which is written into the memory 167 is read out therefrom one frame later.

Thus during the time when the address code is not being inputted into the serial-to-parallel converter 150, a re-circulation occurs in that the content of the frame memory 167 is read out, passed through the adder 166 and again written into the frame memory 167. The code read out from the frame memory 167 is also supplied to a D-A converter 169 for conversion into an analog signal, thus restoring a video signal at an output terminal 170. When a portion of the video signal being transmitted varies, the variation is encoded in the manner mentioned above and is transmitted together with its associated address code. The address code is detected by the serial-to-parallel converter 150 of the receiving side to pass the encoded variation from the converter 150 to the adder 166, thus making correction of the code read out from the frame memory 167.

On the other hand, when a coincidence is detected by the comparator 160, indicating that the refreshing signal is being transmitted, the output of the comparator 160 drives a circuit 172, the output of which changes the switching circuit 168 to the output of the serial-to-parallel converter 150 for one horizontal period, whereby the code from the buffer memory 111 is passed through the converter 150 during one horizontal period to be written into the frame memory 167. In this manner, the refreshing signal is directly written into the frame memory 167, renewing its content.

It has been mentioned previously that the second magnitude adjuster 35 of the transmitting side shown in FIG. 2 can be omitted. In this instance, a corresponding change is made on the receiving side by eliminating the circuit 119 which detects the variety of the frame sync code, the flipflops 134 to 137, the AND circuits 107 to 109 and 138 to 141, the multipliers 120 to 122 and the coefficient circuits 123 to 125. In this manner, the output from the AND circuits 105, 106 is directly supplied to the OR circuit 117. Where the variable word length code converter 36 is not used, the variable word length decoder 101 is eliminated. In the foregoing description, the magnitude of the difference signal has been controlled over four ranges, but the number of such ranges can be changed. Additionally, the threshold circuit 6 and the encoder 7 which have been shown as separate components may be combined together into a single hardware.

Figure 4A:
FIGS. 4A through 4C graphically show one example of the occupancy of the buffer memory.
Figure 4B:
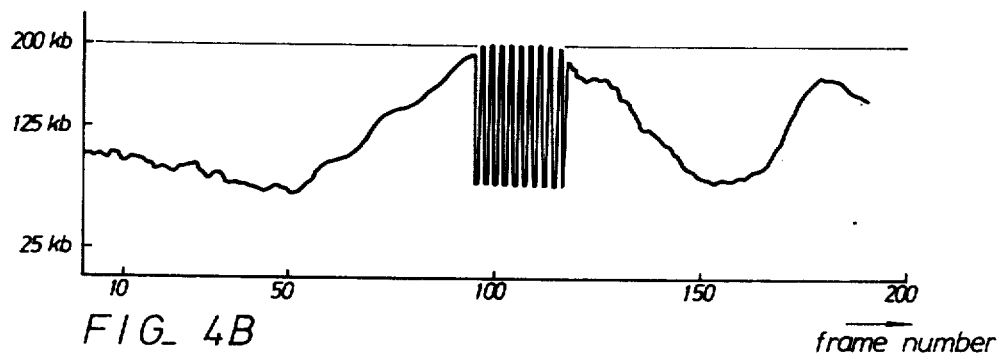
Figure 4C:
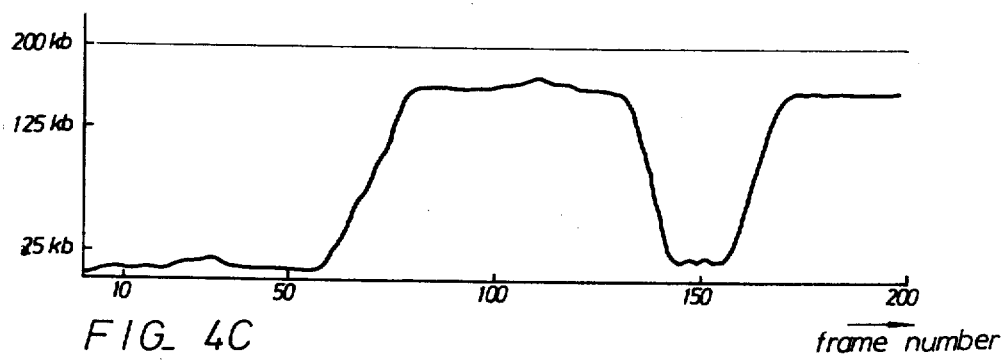

From the foregoing description, it will be appreciated that the interframe coding system according to the present invention prevents an overflow from the buffer memory 9 by controlling the magnitude of the difference signal in accordance with the occupancy of the buffer memory 9, thus eliminating the likelihood of a substantial degradation in the quality of the restored picture. In one experimental example, the interframe coding has been performed on a video signal in a television system having a nominal frequency band of 4 MHz in which a person remained sitting at rest during frames 0 to 70, moves his face to approach a television camera during frames 70 to 90, stands up and walks away during frames 90 to 140 and comes back during frames 140 to 200, as shown in FIG. 4. The threshold in the threshold circuit has been controlled in accordance with the occupancy of the buffer memory. The stored content therein is indicated in FIG. 4B, which shows that during a rapid variation in the picture, overflows occurred from the buffer memory having the capacity of 200k bits. By contrast, when the invention is applied by controlling the difference signal by a factor of three-fourths when the stored content in the buffer memory exceeded 50k bits, by a factor of two-fourths for the stored content exceeding 110k bits and by a factor of one-fourth for the stored content exceeding 170k bits, the result is shown in FIG. 4C wherein it will be noted that no overflow occurs. This will demonstrate the excellent performance of the present invention. In this experiment, the second magnitude adjuster 35 shown in FIG. 2 has been eliminated.

Where a switching of conventional operation modes, that is, a switching to a subsample mode or alternate line mode is used in order to further prevent the overflow, the proportion which these modes assume relative to the overall operation is reduced as compared with the conventional system, achieving a high quality picture. In addition, the degradation in the tracking capability to a rapid change in the picture is not stepwise, but appears as a blurring of the image, so that the visually perceptible degradation is reduced. Since the refreshing signal including quantization errors in the information which are generated by the encoder 7 and the like is used to refresh the frame memory 167 on the receiving side, substantially the same image quality is maintained between refreshed areas and those which are not refreshed, thus preventing the occurrence of a streak across the picture.

Having described the invention, what is claimed is:

1. An interframe coding system comprising:
   a subtracter for outputting a difference signal between an input signal and an output from a frame memory;
   a magnitude adjuster connected with the output of the subtracter for controlling the magnitude of the difference signal;
   an encoder connected with the output of the magnitude adjuster for quantizing the output therefrom to output a code having a smaller number of bits than that of the difference signal, and including means for converting the code into a representative level output signal having the same number of bits as that of the difference signal and indicative of a quantization level;
   an adder connected with the output of the encoder for adding together the representative level output signal and the output from the frame memory;
   the frame memory being connected with the output of the adder for delaying its output by one frame of the input signal;
   a combination of a synchronizing signal generator and an address generator for deriving from the input signal a synchronizing signal and an address signal for defining the position of the output code of the encoder on the frame;
   a buffer memory connected with the output of the encoder for receiving the code output therefrom and the outputs from the synchronizing signal generator and the address generator, which are written into the buffer memory and read out therefrom as code signals of a uniform bit rate; and
   a controller for monitoring the occupancy of the buffer memory to thereby control the magnitude adjuster in accordance with the occupancy so as to prevent an overflow of the buffer memory.

2. The interframe coding system according to claim 1, further including a switching circuit connected between the encoder and the buffer memory for switching the input side of the buffer memory from the output of the encoder to the output of the adder, and means for periodically controlling the switching circuit to switch the input side of the buffer memory to the output of the adder every plurality of horizontal scanning lines of the input signal for a period of time of at least one of the horizontal scanning lines and sequentially shift the position of the horizontal scanning line.

3. The interframe coding system according to claim 1, further including a switching circuit connected between the encoder and the buffer memory, and means for producing an output when the occupancy of the buffer memory has become smaller than a predetermined value to switch the switching circuit from the output of the encoder to the output of the adder while the output is produced.

4. An interframe coding system according to claim 1, further including a variable word length code converter between the encoder and the buffer memory for performing a code conversion whereby, as the frequency of occurrence of a code increases, the number of bits in the code is smaller.

5. An interframe coding system according to claim 4, further including a switching circuit connected between the encoder and the variable word length code converter for switching the input of the variable word length code converter from the output of the encoder to the output of the adder, and means for periodically controlling the switching circuit to switch the input side of the buffer memory to the output of the adder every plurality of horizontal scanning lines of the input signal for a period of time of at least one of the horizontal scanning lines and sequentially shift the position of the horizontal scanning line.

6. An interframe coding system according to claim 1, further including a second magnitude adjuster connected between the encoder and the adder for controlling the magnitude in the opposite direction from the first mentioned magnitude adjuster.

7. An interframe coding system according to claim 6, further including a code generator which generates a code indicative of the controlled state of the second magnitude adjuster and supplies it to the buffer memory.

8. An interframe coding system according to claim 7, further including a circuit for detecting the code indicative of the controlled state of the second magnitude adjuster from the transmitted and received code, means for controlling the magnitude of the received code in the opposite direction from the control by the first mentioned magnitude adjuster and in accordance with the detected code, and means for adding the controlled code and the output from the frame memory together for decoding into a digital video signal.

9. An interframe coding system according to claim 1, further including a threshold circuit connected between the magnitude adjuster and the encoder for supplying a portion of the output from the adjuster which exceeds a given level to the encoder as a significant difference signal.

10. An interframe coding system according to claim 1 in which the magnitude adjuster comprises a plurality of suppression means for suppressing the difference signal by a given factor, the factor of one of the suppression means being different from that of any other suppression means, and means for selecting an output from these suppression means, and in which the controller comprises means for detecting the occupancy of the buffer memory over a plurality of occupancy levels, and means responsive to the detection means for producing a signal which controls the selection means.

* * * * *